United States Patent [19]

Kar et al.

[11] Patent Number: 4,560,175
[45] Date of Patent: Dec. 24, 1985

[54] HERMETICALLY WELDED BELLEVILLE SEAL FOR ROCKS BITS

[75] Inventors: Nareshchandra J. Kar, Westminster; Cary A. Roth, Huntington Beach, both of Calif.

[73] Assignee: Smith International, Inc., Newport Beach, Calif.

[21] Appl. No.: 628,068

[22] Filed: Jul. 5, 1984

[51] Int. Cl.[4] .................. F16J 15/34; F16C 19/49
[52] U.S. Cl. ................................................ 277/92
[58] Field of Search .................. 277/92, 95, 81 R

[56] References Cited

U.S. PATENT DOCUMENTS 3,075,781 1/1963 Atkinson et al. .
3,489,421 1/1970 Neilson .................. 277/95
3,680,873 8/1972 Garner .

Primary Examiner—Robert I. Smith
Attorney, Agent, or Firm—Robert G. Upton

[57] ABSTRACT

This invention relates to a belleville seal for a sealed bearing rotary cone rock bit. The inner static ring portion of the annular belleville seal is metal and is interference fitted over the base of a journal bearing. The separation joint formed between the inner diameter of the static ring portion of the belleville seal and the outside diameter of the journal bearing is circumferentially welded using a high-energy beam source to form a hermetically sealed metallurgical bond therebetween.

12 Claims, 5 Drawing Figures

HERMETICALLY WELDED BELLEVILLE SEAL FOR ROCKS BITS

BACKGROUND OF THE INVENTION

1. Field of the Invention

This invention relates to sealed bearing rotary cone rock bits that utilize belleville seals.

More particularly, this invention relates to sealed bearing rotary cone rock bits that utilize belleville seals between a journal and a cone, the seal being metallurgically bonded and hermetically sealed between the static portion of the seal and its adjacent journal.

2. Description of the Prior Art

There are many patents relating to the use of belleville seals in rotary cone rock bits, most of which are expired.

An early Hughes patent, U.S. Pat. No. 3,075,781, describes a belleville seal disposed between a bearing spindle and a rotary cutter cone mounted to the spindle. A multiplicity of roller bearings are disposed between the rotary cone and the bearing spindle. The belleville seal is designed to "float" between the cone and bearing spindle. The seal face on the inner diameter of the belleville is positioned at the intersection of the spindle and leg backface and the opposite seal face of the outer diameter of the belleville is positioned against the cone backface—both seal faces are dynamic since both slide against their respective sealing surfaces. Experience has shown, however, that it is undesirable to have two dynamic sealing surfaces disposed between fixed and rotating parts.

U.S. Pat. No. 3,489,421, assigned to the same assignee as the present invention, describes a seal for use between relatively rotatable parts. This patent describes an improvement to belleville seals for use in rock bits. The seal consists of an annular metallic retaining ring having a resilient element bonded around one edge portion of the resilient belleville seal element. The retaining ring lies about and has an annular portion interferingly fitted in sealing contact on one of the relatively rotatable parts. The resilient element, in a relaxed position, has a relatively free annular edge portion with a wiping face disposed transversely of the axis of rotation and in sliding contact with one of the opposed surfaces. The metallic retaining ring is spot welded intermittently around the joint between the retaining ring and the journal.

The invention teaches either intermittent spot welds around the metal ring fitted to the journal or the use of a punch to distort one portion of the metallic retaining ring into the journal onto which the ring is connected. Obviously, the reason the belleville seal is spot welded is to prevent its rotation during operation of the bit in the borehole.

A further refinement of the belleville seal art resulted in U.S. Pat. No. 3,680,873, also assigned to the same assignee as the present invention. The seal includes an inner annular ring, preferably metallic, and an outer annular element of yieldable seal material. The inner resilient ring has a weakened breakpoint which will remain unbroken during the bonding of the annular yieldable rubberlike material to the ring. The ring is separable at the breakpoint when forced over an abutment on one of the relatively rotatable parts. The ring and yieldable material are returned or "spring back" to approximately their original diameters after passing the ridged abutment. The yieldable material is subjected to pressure deformation to tightly secure the resilient ring radially inwardly about the relatively rotatable part and axially outwardly against the abutment. The patent addresses the problem of securing the inner diameter static portion of the belleville seal against a rock bit leg backface to prevent the static portion or inner annular portion of the belleville seal from rotating. The present practice is to spot weld the inner metallic ring of the belleville seal to secure the broken ends of the ring and to prevent rotation of the ring during operation of the rock bit.

The present invention incorporates a design encompassing less machining operations as will become evident from the text of this disclosure. In the present invention, the inner metallic ring of the belleville seal is placed over the bearing journal with a slight interference fit. The inner metallic ring is then welded around its circumferential interface between the journal and the bearing ring. The necessity to mechanically lock an inner split ring over an abutment is therefore obviated. A high-energy beam welding process, such as continuous laser or pulsed laser or electron beam, is preferred because a 360° weld on a typical journal can be completed in a few seconds. The beam is focused to a very small cross-sectional area at the intersection of the inner metallic ring of the belleville seal and the leg journal. The combination of the localized high-energy input and short welding time results in a weld that hermetically seals the static side of the belleville seal and does not degrade the elastomer material encapsulating the belleville spring or the metallic members.

SUMMARY OF THE INVENTION

It is an object of this invention to provide a means to hermetically seal the inner diameter of a belleville seal to a journal bearing.

More specifically, it is an object of this invention to circumferentially beam weld an inner annular metallic ring of a belleville seal to the base of a journal bearing to effect a positive hermetic seal therebetween.

A sealed bearing rotary cone rock bit consists of a rock bit body having a first pin end and a second cutting end. There is one or more rotatable cones secured to a journal bearing cantilevered from a portion of the bit body near the cutting end of the bit. A belleville seal is disposed between the rotatable cone and its journal. The seal has a first annular dynamic seal face and a second annular static portion. The second annular static portion has a metallic member that is metallurgically bonded to its static counterpart circumferentially through the annular interface formed between the second static portion and its counterpart. The hermetic seal thus formed by the weld at the static portion prevents ingress of detritus thereby during rock bit operation.

The belleville seal usually has its first outer annular dynamic seal face positioned against the rotatable cone while the inner second metallic static portion is positioned adjacent an intersection between the journal bearing and a leg backface. The inner metallic annular portion of the belleville seal is placed over the journal bearing with a slight interference fit. The inner portion of the belleville is secured against the intersection of the leg backface and the journal. The inner metallic portion of the belleville may be first tack welded to the journal at the interface formed between the metal portion of the belleville and the journal. The tack welds are utilized to prevent the belleville seal from distorting or "creeping"

during the subsequently occurring, continuous weld operation. The welding operation is then performed circumferentially to hermetically seal the inner metallic ring of the belleville seal to the journal bearing The preferred welding operation is accomplished through the use of a continuous-wave laser welding process.

An advantage then of the present invention over the prior art is the ability to metallurgically bond the inner static portion of a belleville seal to create hermeticity. This portion of the belleville seal prevents passage of detritus material or lubricant thereby.

Another advantage of the present invention over the prior art is the strength of the circumferential weld in the belleville seal which prevents rotation and lift-off during operation of a rotary cone rock bit in a borehole.

Another advantage of the present invention over the prior art is the ability to metallurgically bond an inner static ring of an elastomerically encapsulated belleville seal without degrading the appended elastomer during the beam welding process nor will the process degrade the metallic members.

Another advantage of the present invention over the prior art is the method of simplified machining operations yielding more positive and accurate location of the dynamic seal face.

The above noted objects and advantages of the present invention will be more fully understood upon a study of the description in conjunction with the detailed drawings.

DESCRIPTION OF THE PREFERRED EMBODIMENTS AND BEST MODE FOR CARRYING OUT THE INVENTION

Figure 1:
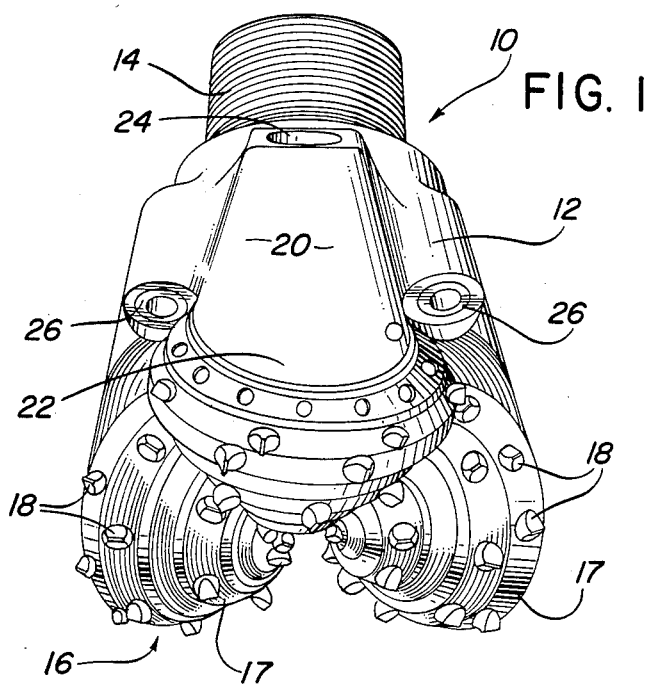
FIG. 1 is a perspective view of a typical three cone sealed bearing rock bit.

With reference now to FIG. 1, the sealed bearing rotary cone rock bit, generally designated as 10, consists of rock bit body 12, pin end 14, and a cutting end, generally designated as 16. Each cone 17, making up cutting end 16, is attached to a leg 20 that terminates in a shirttail portion 22. Each of the cones 17 has, for example, a multiplicity of equally spaced tungsten carbide cutter inserts 18 interference fitted within the cone bodies 17. Three or more nozzles 26 communicate with a chamber formed inside the bit body 12 (not shown). The chamber receives drilling fluid or "mud" through the pin end 14. The fluid then is directed out through the nozzles 26 during bit operation. A lubrication reservoir 24 is provided in each of the legs 20 to supply lubricant to bearing surfaces formed between the rotary cones and their respective journals.

Figure 5:
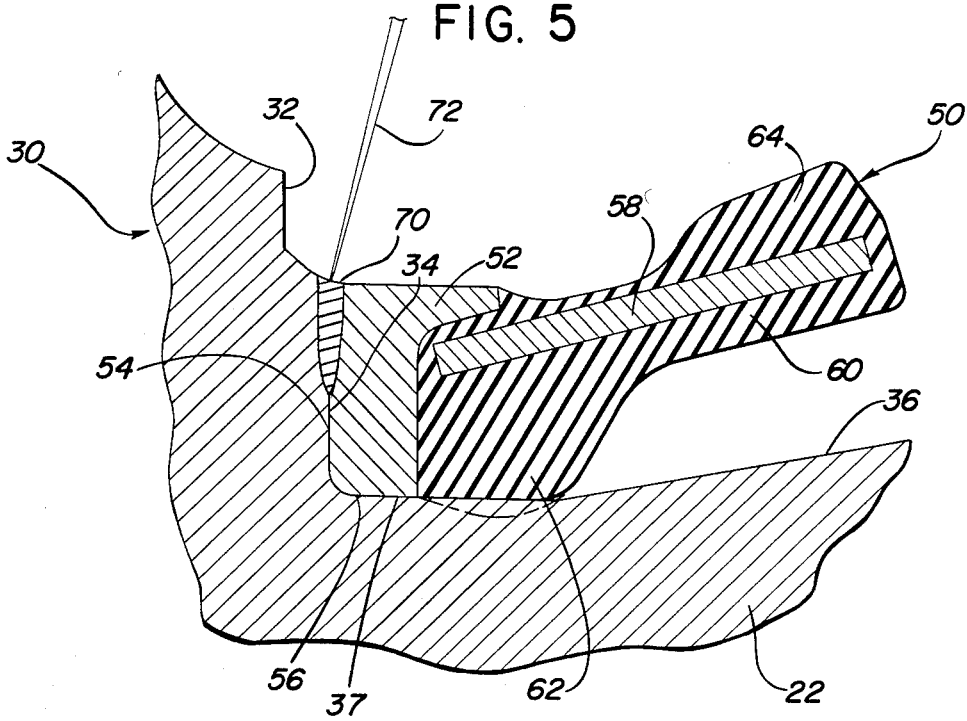
FIG. 5 is an enlarged fragmented cross section of a high-energy beam welded belleville seal mounted to a journal bearing of a rock bit.
Figure 2:
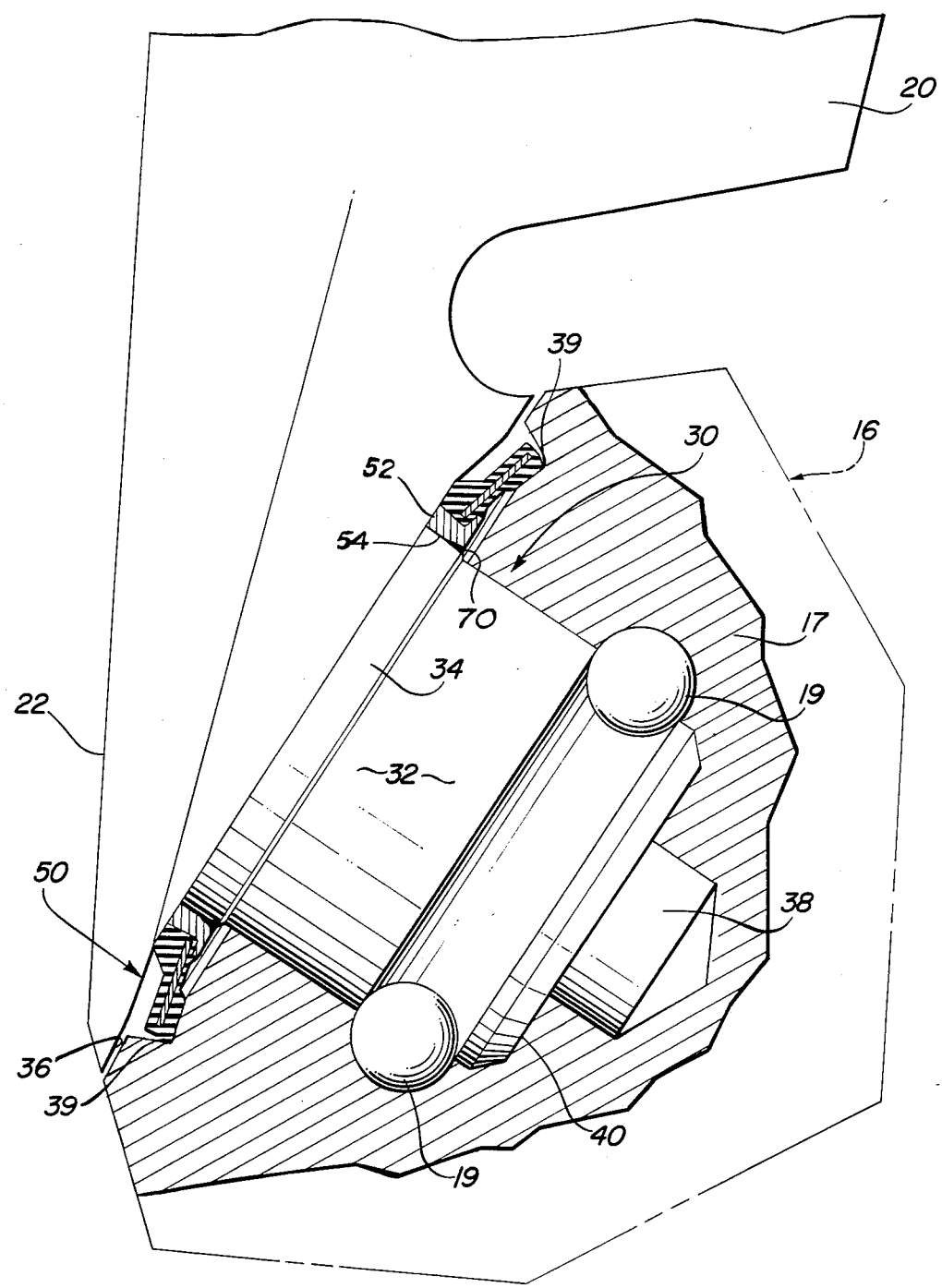
FIG. 2 is a partially broken away cross section illustrating a cone rotatively mounted to a journal with a belleville seal in place.

The partially cut away cross section illustrated in FIG. 2 depicts the cone 17 mounted onto a journal pin, generally designated as 30. The journal pin 30 is cantilevered from the shirttail portion 22 of leg 20. A bearing surface 32 is formed on the journal pin 30. The journal also forms a ball race for cone retention balls 19. A complementary cone retention ball race is formed in the cone 17. A belleville seal, generally designated as 50, is positioned between a leg backface 36 of shirttail 22 and a cone backface 39 of cone 17. The belleville seal 50 is comprised of an inner metal ring 52 (FIG. 5). The inner, axially disposed circumferential surface 54 is sized to form a slight interference fit over raised, annular surface 34 of journal 30. The seal is pressed over the raised complementary journal surface 34 with an interference fit.

The journal 30 further consists of a "snoochie" face 40 (FIG. 2); the radially disposed bearing surface 40 being oriented 90° to an axis of the journal. Extending from radially disposed surface 40 is a spindle bearing 38 that mates with a complementary bearing surface in the cone 17.

With reference specifically to the enlarged fragmentary cross section of FIG. 5, the belleville seal 50 consists of an exposed inner metallic ring 52 that is interference fitted over raised annular surface 34 of journal 30. The radially disposed surface of ring 52 abuts surface 37 in leg 20. Belleville spring 58, the "heart" of the belleville seal, is encapsulated within elastomer 60. An inner portion 62 of the elastomer 60 is compressed against radial surface 37 of leg 20 near shirttail end 22. When the belleville seal is assembled onto journal 30, the ring 52 is, as heretofore stated, interference fitted over axial surface 34. The inner diameter of ring 52 at axial surface 54 is from zero to four thousandths smaller in diameter than axial surface 34. The elastomer 62 adjacent ring 52, in a relaxed state, may extend beyond surface 56 (shown in phantom).

Figure 3:
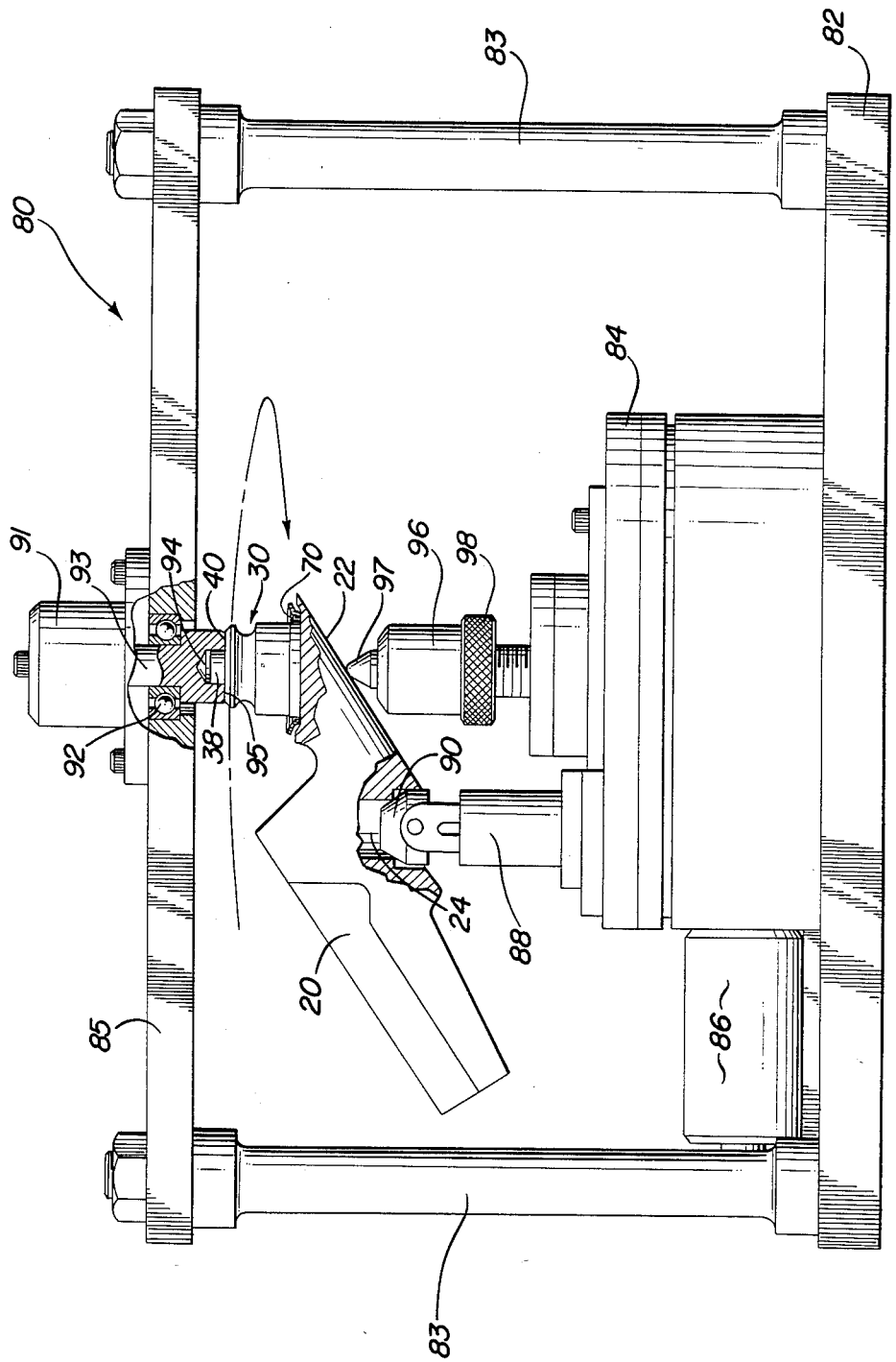
FIG. 3 is a partially broken away cross section of one leg of a three cone rock bit, the leg being mounted to a rotatable turntable to facilitate a circumferential beam weld operation of a belleville seal to the leg.

Referring now to FIG. 3, the welding fixture, generally designated as 80, consists of a fixture base 82, support posts 83, turntable 84, and upper fixture frame 85. A variable speed drive motor 86 is geared to turntable 84 to drive the turntable at different speeds. A driving arm 88, attached to turntable 84, is designed to engage the grease reservoir cavity 24 formed in leg 20. The purpose of the leg drive arm 88 is to rotate the leg 20 in the welding fixture 80. The leg 20 is inserted within a rotatable leg journal centering spindle 93, mounted to frame 85 of fixture 80. The cylindrical recess 94 in the end of the leg journal centering spindle 93 is formed to mate with the spindle 38 that extends from the end of journal 30. The journal snoochie face 40 mates with or abuts against a complementary surface 95 formed in centering spindle 93 to accurately position the leg journal bearing 30 within the rotatable leg centering spindle 93. The journal is firmly urged into engagement with the rotatable spindle 93 by a leg holding apparatus 96. The end 97 of the holding apparatus or tooling fixture 96 abuts against the leg backface 22. The knurled threaded jam nut 98 is rotated toward the leg backface 22, forcing the contact pin 97 against the leg backface 22. The end of the contact pin 97 is axially aligned with the centerline of the journal bearing 30 to assure firm contact and proper alignment of the leg journal bearing with the rotatable centering spindle 93 of welding fixture 80. The spindle 93 is rotatively contained by a pair of roller bearings 92 secured within frame 85 and housing 91, one of which is shown in FIG. 3.

The leg, of course, is inserted within the welding fixture 80 after the belleville seal is pressed onto the raised annular surface 34 formed in journal 30 of leg 20.

Figure 4:
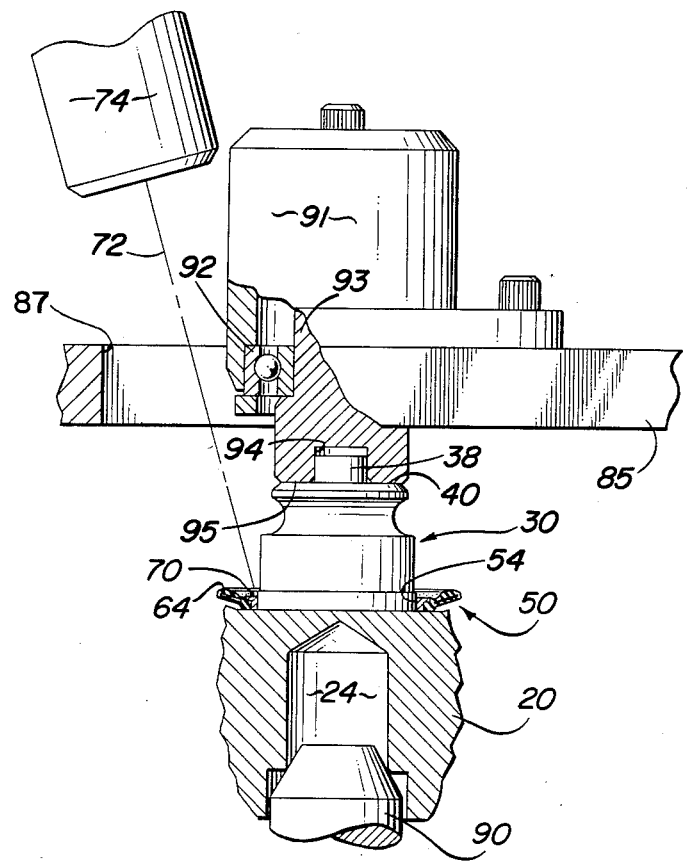
FIG. 4 is a partially broken away view rotated 90° with respect to FIG. 3, illustrating the high-energy beam focused at an intersection of the belleville seal and journal.

Referring now to FIG. 4, the partially cut away view illustrates the leg 20 rotated 90° from the view shown in FIG. 3. Part of the leg 20 is sectioned to show the engaging end 90 of turning mechanism 88 inserted within the cavity for the lube reservoir system 24. An opening 87 in the upper fixture frame 85 is provided adjacent the journal centering spindle housing 91 to allow an electron beam or a laser beam, to be directed toward the intersection or joint 70 formed between the raised annular surface 34 in bearing 30 and the inner diameter 54 of metal ring 52, the metal ring being an integral part of the belleville seal 50. A welding beam 72, such as a laser beam, is directed to the joint or interface 70 between the ring 52 and surface 34 at an angle between ten and twenty degrees with respect to the centerline of the journal 30. A preferred laser beam angle is about fifteen degrees.

With the leg 20 securely positioned within receptacle 94 of the rotatable journal centering spindle 93 (the snoochie 40 being in firm contact with complementary surface 95 in the end of spindle 93), the bearing journal 30 then will track concentrically with the spindle 93. Hence, the interface or separation joint formed between the belleville ring 52 and bearing surface 34 of journal 30 will track concentrically with the journal bearing 30. The electron beam or laser beam 72 will accurately track the joint 70 as the leg is rotated through 360° by the leg rotary table 84.

After the leg 20 is loaded onto the tooling fixture 80, secured in place by the leg locking fixture 96, the leg will accurately rotate around the centerline of the journal bearing 30, thus assuring accurate tracking of the separation joint 70 between the belleville ring 52 and raised bearing surface 34.

The circumferential welding function is accomplished as follows. The turntable rotation is started (see FIG. 5). The ring 52 may then be first tack welded in, for example, three different places at the intersection 70 between the journal bearing surface 34 and inner parallel surface 54 of the ring 52. A typical example would include tack welds placed about 120° from each other prior to the continuous welding process. The purpose of the tack welds would be to prevent "creep" of the ring during the continuous welding process. The continuous weld process then continues around the full circumference at the interface 70 to create a hermetic weld.

A continuous-wave laser welding process is preferred. For example, a Spectra-Physics laser, Model No. 820, is utilized. The particular laser used is a 1500 watt industrial laser and is a $CO_2$ gas transport type. The laser is manufactured by Spectra-Physics at San Jose, Calif. The welding sequence typically used is as follows. Utilizing the laser set forth above, the rotary table 84 is started at about 200 surface inches per minute and the tack welds may be placed, using a power level of about 1000 watts (each of the tack welds having a dwell time of about 0.1 seconds). After the tack welds are completed, the power level of the laser is set up to about 1250 watts and interface 70 is circumferentially welded. As an example, with an interface 70 of about 2.125 inches, the ramp-up speed of the laser being 0.1 seconds, a dwell time of about 2.1 seconds is required to complete the circumferential weld, with a ramp-down time of 0.2 seconds. A weld shielding gas is utilized at about 100 cubic feet per hour to flood the weld area during the tack welding and circumferential welding process. To reiterate, the rock bit leg 20 is started in rotation, the shielding gas flow is initiated and the shutter to the laser welder is opened. The laser is then ramped-up (0.1 seconds), with a dwell time of about 2.1 seconds, to complete the circumferential weld. A laser ramp-down then occurs for about 0.2 seconds, followed by closing the shutter to the laser welding device.

With reference to FIG. 5, the laser beam 72 is shown focused in on the interface 70, providing a weld penetration as shown between the journal 30 and the ring 52 of belleville seal 50.

It would be obvious to utilize an electron beam or pulsed laser beam rather than a continuous-wave laser welding system to accomplish a circumferential weld. However, the continuous-wave laser welding process is preferred because of the speed in which the part-loading and welding cycle can be accomplished. Obviously, the elastomeric material 60 encapsulating the ring 52 and the inner belleville spring 58 is not affected due to the localized weld at the intersection 70 and the speed at which the beam accomplishes the weld. The end of the high-energy beam 72 is focused very narrowly to precisely intersect the joint 70 formed between the annular ring 34 and the belleville ring 52, thus enabling a very narrow, penetrating weld between the two surfaces 34 and 54.

It would be obvious to utilize an exposed metal ring on the outer diameter of the belleville seal, the inner elastomeric encapsulated portion of the seal being the dynamic seal face (not shown). The outer metal ring of the belleville seal then would be circumferentially welded to the cone. The dynamic portion of the seal would be adjacent the leg journal and backface.

It would also be obvious to utilize the teachings of this invention in other than rotary cone rock bits. For example, sealed bearing motors used for high-speed rock bit drilling. It is also anticipated that other rotating devices that incorporate lubricated bearing systems could take advantage of the teachings of this invention.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A sealed bearing rotary cone rock bit comprising:
    a rock bit body forming a first pin end and a second cutting end, at least one rotatable cone is secured to a journal bearing cantilevered from a portion of said bit body near said second cutting end of said body, and
    a belleville seal disposed between said at least one rotatable cone and said journal, said seal having a first annular dynamic seal face and a second annular static portion, said second annular static seal portion being metal, said static metal portion is metallurgically bonded to its static counterpart through 360° of its circumference at an interface formed between said second static seal portion and said counterpart with a high-energy welding system having a power level in a focused region at said interface of at least 1000 watts, said metallurgical bond thereby hermetically seals said metal static portion to said counterpart.

2. The invention as set forth in claim 1 wherein a portion of said belleville seal is encapsulated with an elastomeric material, said encapsulated portion being at said first annular dynamic seal face.

3. The invention as set forth in claim 1 wherein said first annular dynamic seal face forms an outer diameter of said belleville seal, said second annular metal static portion forms an inner diameter of said belleville seal, said inner metal static portion is metallurgically bonded with said high-energy welding system to said journal bearing through 360° of its circumference at an interface formed between said second inner metal portion and said journal bearing, said first dynamic seal face is positioned against said rotatable cone secured to said journal.

4. The invention as set forth in claim 3 wherein said second annular metal static portion of said belleville seal is interference fitted over said journal bearing prior to metallurgically bonding said metal seal portion to said journal bearing through 360° of said circumferential interface formed therebetween.

5. The invention as set forth in claim 4 wherein an inner diameter of said second annular metal static portion of said belleville seal is from zero to four thousandths of an inch smaller in diameter than the diameter of said journal bearing.

6. The invention as set forth in claim 1 wherein said high-energy welding system is a continuous-wave laser welding system.

7. The invention as set forth in claim 6 wherein said belleville seal is tack welded at said interface between said second inner metal portion and said journal bearing one or more places prior to said 360° circumferential weld to prevent said belleville seal from creeping and distorting during said high-energy welding operation.

8. The invention as set forth in claim 7 wherein said belleville seal is tack welded at said interface between said second inner metal portion and said journal bearing three places about 120° apart.

9. The invention as set forth in claim 8 wherein a power level of said continuous-wave laser to tack weld said metal portion of said belleville seal to its static counterpart is about 1000 watts.

10. The invention as set forth in claim 9 wherein a power level of said continuous-wave laser to circumferentially weld said metal portion of said belleville seal to its static counterpart through 360° is about 1250 watts.

11. The invention as set forth in claim 1 wherein said high-energy welding system is a pulsed laser welding system.

12. The invention as set forth in claim 11 wherein said high-energy welding system is an electron beam welder.

* * * * *